United States Patent Office 2,763,188
Patented Sept. 18, 1956

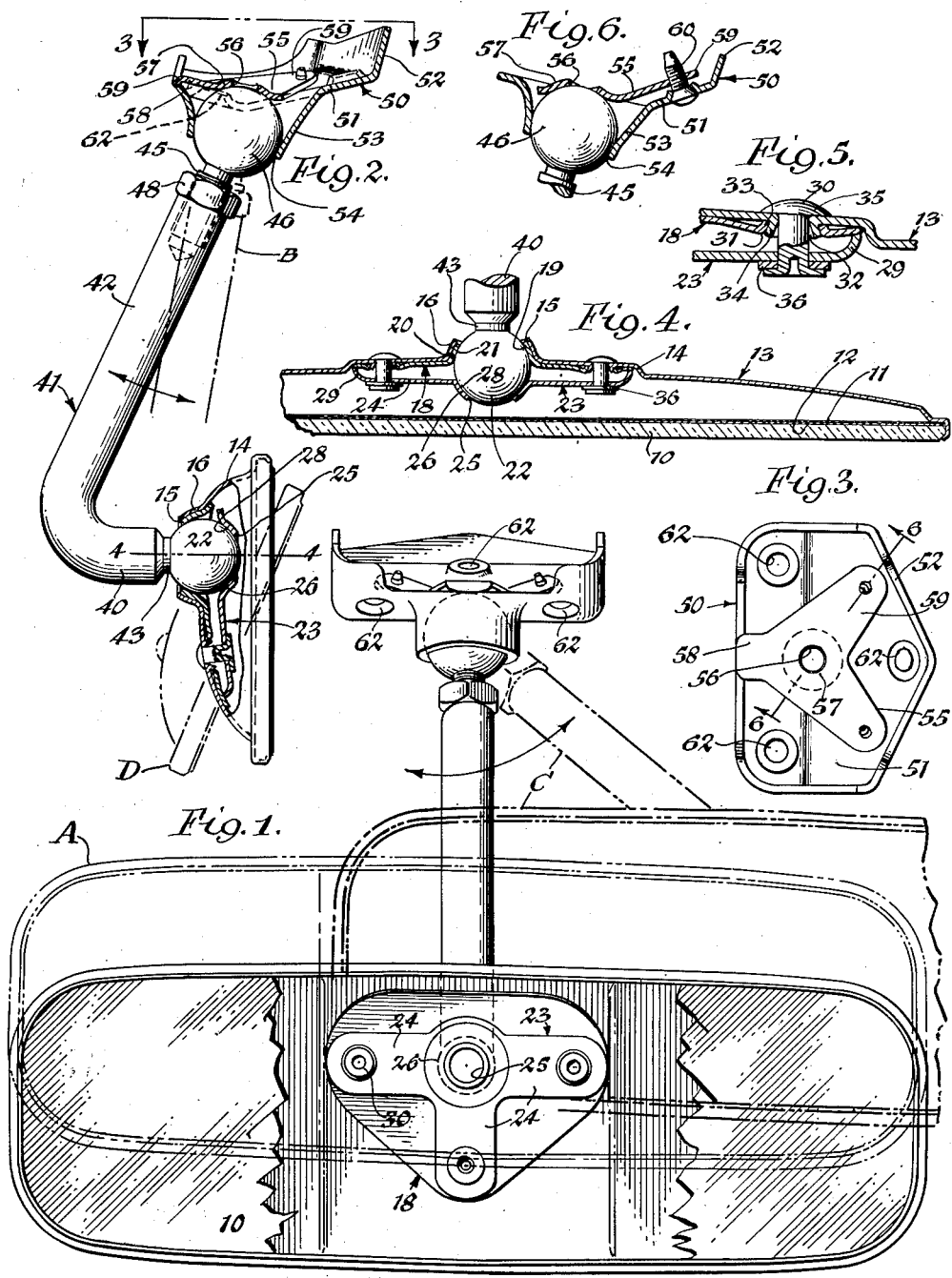

2,763,188

REAR VISION MIRROR ASSEMBLY

Paul Bertell, Kenmore, N. Y., assignor to Standard Mirror Company, Buffalo, N. Y., a corporation of New York Application June 3, 1953, Serial No. 359,386

1 Claim. (Cl. 88—98)

This invention relates to a rear vision mirror assembly and more particularly to such a rear vision mirror assembly adapted for use within a pleasure automobile and which reflects to the driver of the automobile the view through the rear window thereof.

The present trend toward larger rear windows and larger windshields in pleasure cars permits of the use of a larger rear vision mirror inside of the car this being desirable, of course, to provide a larger rear vision view to the driver of the automobile. On the other hand such larger rear vision mirrors result in an increased obstruction to the vision of the driver forwardly through the windshield. The effect of the rear vision mirror in obstructing the forward view is a serious consideration, particularly with taller drivers and particularly with the lowering of the roofs of automobiles.

It has been found that relatively slight adjustments of the position of the mirror will permit a larger rear vision mirror to be used in rear of the upper part of the windshield without undesirably obstructing the forward view of the driver, through the windshield. On the other hand, such adjustment must be made for the individual driver and must permit both vertical and horizontal positioning of the mirror to suit the driver. Further such adjustment must permit a wide degree of adjustment to be adapted to drivers of strikingly different heights and driving habits.

It is accordingly one of the principal objects of the present invention to provide an interior rear vision mirror assembly for an automobile which has a high degree of adjustability both as to its vertical position and also as to its horizontal position as well, of course, as being tiltable about either a horizontal or a vertical axis as well as being capable of being leveled.

Another object of the invention is to provide such a rear vision mirror assembly in which such wide degree of adjustment can be obtained without the use of tools.

Another object of the invention is to provide such a rear vision mirror assembly which is supported from the roof or ceiling of the automobile and which can be designed to have any desired effective height.

Another object of the invention is to provide such a rear vision mirror assembly which includes two universal joints arranged in series, and in which that universal joint closest to the point of attachment to the automobile body has substantially greater frictional resistance to movement than the other or outboard universal joint. By this means it is possible to adjust the mirror about the outboard universal joint without disturbing the inboard universal joint and, when it is desired to adjust the inboard universal joint, this can readily be done by seizing the part interposed between the two universal joints.

Another object of the present invention is to provide such a rear vision mirror assembly in which the metal case for the mirror, and the connection to the adjacent universal joint is light in weight thereby to provide a minimum tendency for the rear vision mirror to lose its adjustment under the effects of vibration and jar.

Another object of the invention is to provide such a rear vision mirror assembly which is free from undesirable vibratory movement in use.

Another object of the invention is to provide such a mounting which can be used both with conventional plane mirrors as well as with the so-called prismoidal mirrors as shown in the Bertell and Meade Patent No. 2,640,394 dated June 2, 1953 for Rear Vision Mirror.

Another object is to provide such a rear vision mirror which is of strong and durable construction and at the same time is low in cost.

Another object of the invention is to provide such a rear vision mirror which is of pleasing and attractive appearance when viewed from any direction.

Other objects and advantages of the invention will be apparent from the following description and drawings in which:

Fig. 1 is an elevational view of a rear vision mirror assembly embodying the present invention, the view being a front elevational view with reference to the mirror panel.

Fig. 2 is a side elevational view, partly in section, viewed from the left hand side of Fig. 1.

Fig. 3 is a top elevational view viewed from line 3—3, Fig. 2.

Fig. 4 is a fragmentary horizontal section taken generally on line 4—4, Fig. 2.

Fig. 5 is a fragmentary enlarged section similar to Fig. 4 and showing one of the rivet connections in greater detail.

Fig. 6 is a section taken generally on line 6—6, Fig. 3.

Fig. 7 is a diminutive view similar to Fig. 2 and showing a modified form of the invention, this view being partly in section.

The rear vision mirror assembly embodying the present invention is shown as including a glass mirror panel 10 which is generally of the outline shown in Fig. 1 and which is shown as being beveled at its margin and backed by a piece of cardboard 11, the rear surface of this mirror being provided with a reflective coating, as indicated at 12. This glass mirror panel is secured in a thin gage metal case 13 the marginal part of which forms a bezel which embraces and fits the bevelled margin of the mirror as best shown in Figs. 1 and 4. The central part of the metal case 13 is dished rearwardly and at its center is provided with a rearward offset 14, this offset extending substantially the full height of the case. An opening 15 is provided at the center of this offset 14 nearer to the top horizontal edge than the bottom horizontal edge thereof, and the metal around this opening is offset rearwardly to provide a spherical rim 16 the concave side of which forms a ball seat and faces toward the interior of the case 13.

The metal case 13 is preferably made of a comparatively light gage metal both to facilitate its forming operations and to reduce cost but more important to reduce the weight of the mirror assembly of which it forms a part. With such light gage metal it is essential that the central offset 14, particularly its spherical rim or seat 16 be reinforced, and to this end a reinforcing plate 18 is provided. This reinforcing plate, as best shown in Fig. 1, is of generally heart shaped outline and, as shown in Figs. 2 and 4 is in face-to-face relation with and generally conforms to the inner face of the offset 14 of the case 13. In particular, it is provided at its center with an opening 19 surrounded by a spherical rim 20 which registers with and conforms to the spherical seat or rim 16 of the case 13 and formsa seat 21 for a smaller ball 22.

The subassembly as above described is mounted for universal movement on this ball 22 and to provide the desired friction between the subassembly as above described and the ball 22 a spring plate 23 is provided. As best shown in Fig. 1 this spring plate preferably has three arms 24 which radiate from a central opening 25 surrounded by a forwardly extending spherical rim 26 and which forms a spherical seat 28 for the ball 22. Two of the arms 24 preferably extend horizontally and the third extends vertically downwardly from the spherical rim 26. The outer end of each of the arms 24 is preferably bent rearwardly, as indicated at 29, to engage the forward face of the reinforcing plate 18 near the margin thereof as best shown in Fig. 5. To secure the reinforcing plate 18 to the metal case 13 and the spring plate 23 against the reinforcing plate 18, the construction best shown in Fig. 5 has been found to be particularly desirable.

A rivet 30 extends through the outer end of each of the arms 24 of the spring plate 23 and through holes 31 and 32, respectively, in the reinforcing plate 18 and case 13. The material removed from the hole 31 is offset rearwardly to provide an open ended, rearwardly projecting frustoconical neck or rim 33 and the material forming the hole 32 is offset rearwardly to provide an open ended, frusto-conical neck or rim 34 which conforms and extends into and is firmly fitted in the corresponding neck 33 of the reinforcing plate 18. By providing the interfitting frustoconical necks 33, 34 as shown in Fig. 5, the reinforcing plate 18 is firmly and positively secured to its case 13 independently of the rivets 30 and at the same time openings are provided for these rivets. Each of these rivets can be provided with a rounding head 35 against the outer face of the case 13 and its other end can be upset against a small washer 36.

In the form of the invention shown in Figs. 1–6 the ball 22 is integral with the horizontally extending end 40 of an angular arm or rod 41, the other generally vertical end 42 of which extends upwardly. The connection between the ball 22 and the angular arm or rod 41 is through an integral contracted neck 43 and the ends 40, 42 of the angular arm or rod 41 lie in the same plane but the included angle between them is less than 90°. The end 40 is preferably of the length shown, this being the minimum length which will permit the desired tilting of the mirror assembly frictionally mounted on the ball 22. The length of the end 42 will vary in accordance with the make of car.

The upper extremity of the end 42 of the angular arm 41 is internally threaded to receive the externally threaded neck or stem 45 of an integral metal ball 46, the ball 46 being preferably substantially greater in diameter than the ball 22. A lock nut 48 insures the rigid attachment of the ball 46 to the angular arm or rod 41.

The ball 46 is housed within a sheet metal attaching bracket or case 50 adapted to be secured to the roof or ceiling of the automobile. However, the rear vision mirror assembly can also be advantageously hung from the moulding or leader above the windshield or mounted on the dash. For this purpose the attaching bracket or case 50 has a generally horizontal portion 51 provided with marginal upstanding flanges 52 arranged to engage the underside of the ceiling of the automobile. The generally horizontal part is formed to provide a downwardly extending neck 53 the walls of which converge to an opening 54 which is of smaller diameter than the diameter of the ball 46 so as to form a seat for this ball. The attaching bracket 50 can be provided with screw holes 62 by means of which the bracket can be attached to the roof of the automobile, the roof not being shown.

A spring plate 55 is also secured to the attaching bracket 50 to bear frictionally against the ball 46. As best shown in Fig. 3 this spring plate has a central opening 56 surrounded by an upwardly dished portion 57 which latter forms a seat for the upper face of the ball 46. The spring plate 55 has a relatively short arm 58 the end of which is downturned, as indicated at 59, Fig. 2, and bears against the rear part of the attaching bracket 50. The spring plate also has two diverging arms 59 the end of each of which is connected by a screw 60 to the attaching bracket 50. Each screw 60 is preferably threadedly connected with its arm 59 and rotatably connected with the attaching bracket 50, as shown in Fig. 6, so that by turning these screws 60 the degree of pressure exerted by the spring plate 55 against the ball 46 can be varied.

The modified form of the invention shown in Fig. 7 is identical with the preferred form except that the larger ball, 46a, is integral with the angular arm 41a whereas the smaller ball 22a has its neck 43a threaded and screwed into the end 40a of the angular arm 41a. Since in other respects the modified form is the same as the preferred form the same reference numerals have been employed and distinguished by the suffix "a." The purpose, of course, of having either of the balls removable is to permit of assembly of the rear vision mirror.

The rear vision mirror as above described has its attaching bracket or case secured, by screws (not shown) extending through its screw holes 62, to the roof moulding or ceiling or dash of a passenger car close to the windshield and usually near the center of the windshield. A feature of the rear vision mirror is that the area of the glass panel 10 can be unusually large to give the driver a larger view of what is happening in rear of his automobile. Such larger mirror panels 10 are permitted by the larger rear windows that are currently being provided in passenger cars. However such larger mirror panels necessarily, of course, provide a greater degree of obstruction to the view of the driver through the windshield.

While such obstruction to the forward view of the driver through his windshield by such larger panels 10 in the rear vision mirror have been found to be a serious disadvantage; it has been found that this disadvantage can be overcome by comparatively slight adjustment of the position of the mirror panel 10. Thus by a slight adjustment upwardly or downwardly or to the right or to the left, to suit the stature and position of the driver, the larger mirror panel 10 can be moved to a position in which it will not obstruct any vital part of the forward view and, at the same time, through its greater size, provide a much better rear view. The present invention is essentially concerned with the provision of such adjustment.

Thus it will be noted that vertical adjustment of the mirror panel 10 can be accomplished in a number of ways. A major adjustment of the vertical position of the rear vision mirror panel 10 can be made by simply seizing the subassembly rotatably mounted on the smaller ball 22 and rotating it 180° about a horizontal axis so that the mirror panel 10 is arranged upside-down as compared with the original assumed position. This raised position of the mirror panel 10 obtained by the simple expedient of turning its case 13 about a horizontal axis is indicated by the light dot-dash lines A, Fig. 1. It will be appreciated that the reason that the mirror panel 10 is raised and lowered by turning its case 13 about a horizontal axis is because its rearwardly offset ball seat 16 is offset vertically with reference to the center of the mirror panel 10, that is, is arranged closer to one horizontal edge of the mirror panel 10 than to the other.

A still greater degree of change in the vertical positioning of the mirror panel 10 can be obtained by swinging the angular arm 41, to the right or to the left. Thus upon swinging the angular arm 41 from the full to the heavy dot-dash line position C, Fig. 1, it will be seen that the elevation of the mirror panel 10 is raised to a greater degree than by turning the case 13 about its horizontal axis.

It will also be seen that minor adjustments of the vertical position of the mirror panel 10 can be achieved by swinging the angular arm or rod 41 forwardly or rearwardly as illustrated in Fig. 2. Thus, with the balls 46 and 22 substantially in vertical alinement, upon moving the arm 41 to the dot-dash position B illustrated in Fig. 2, the mirror panel 10 will be raised slightly because it swings about the axis of the ball 46.

It will also be seen that all of the different adjustments above described can be used additively or in any combination. Thus to secure maximum elevation of the mirror panel 10 from the lowest possible elevation (illustrated substantially by the full line position of the parts in the drawings), its case 13 would first be rotated 180° about a horizontal axis to bring it to the dot-dash line position A, Fig. 1. The angular arm 41 would then be swung to the right or left to its extreme position such as illustrated by the dot-dash lines C, Fig. 1. This would raise the mirror panel 10 still higher. The angular arm 41 could then be swung forwardly or rearwardly, as illustrated by the dot-dash lines B, Fig. 2 so as to raise the mirror panel 10 still higher.

It will also be seen that the mirror panel 10 can be moved a substantial distance in a horizontal direction either transversely of the automobile, as illustrated by the dot-dash lines C, Fig. 1, or fore-and-aft as illustrated by the dot-dash lines B, Fig. 2. Also in any position selected the rear vision mirror panel 10 can be leveled and also its vertical angularity can be adjusted, as illustrated by the dot-dash lines D, Fig. 2. The horizontal angularity of the panel 10 can also, of course, be adjusted to reflect the desired view from the rear window of the car into the eyes of the driver.

It will be particularly noted that since a greater frictional resistance is impressed against movement of the ball 46 as compared with the ball 22, the subassembly comprising the mirror panel 10 and its case 13 can be freely adjusted on the ball 22 without disturbing the adjustment of the angular arm 41. Similarly, by seizing this angular arm 41, it is possible to adjust this arm in relation to the attaching bracket or case 50 without disturbing the adjustment of the subassembly 10, 13, on the smaller ball 22. This is of importance because it is highly unsatisfactory and, with a rear vision mirror, dangerous, to have multiple adjustments the manipulation of one of which will throw out the others.

It will also be seen that by providing the angular arm 41 with the generally horizontal and vertical end portions 40, 42 respectively, as shown, particularly with the included angle between these end portions being less than 90°, the free manipulation of the subassembly comprising mirror panel 10 and its case 13 about the ball 22 is not interfered with in any of the above described position of adjustment of the parts. At the same time, in the normal position of the parts, the center of gravity of the mirror panel 10, its case 13 and also the horizontal end 40 of the angular arm 41 is under the ball 46 so that there is little tendency of the mirror to move to a position of misadjustment due to the vibrations to which it is subjected.

It will also be seen that the connection between the reinforcing plate 18 and the case 13 as well as of the spring plate 23, as illustrated in Fig. 5, provides a very simple, reliable connection between these parts and which permits of the use of very light metals for each.

I claim:

A rear vision mirror assembly comprising a mounting bracket adapted to be secured to the ceiling of an automobile near the windshield thereof and having a hole in its underside surrounded by an upwardly facing concave seat, an angular metal arm having an upper relatively long and substantially straight upwardly extending end and a lower relatively short substantially straight end arranged to extend horizontally away from said windshield and said ends forming a generally V-shaped crook in said arm and said ends being arranged generally in a common plane, a first ball at the upper extremity of said upwardly extending end and seated in said concave seat, a reflective mirror plate, a metal case supporting said mirror plate and enclosing the rear side thereof and having a hole surrounded by a concave seat facing said mirror plate, said last hole being arranged closer to one horizontal edge of said metal case than to the other horizontal edge thereof, a second ball at the outboard extremity of said lower horizontally extending end and seated in said last concave seat, means securing said balls to the corresponding ends of said arm with at least one of said balls being secured as a separate member, and means frictionally resisting movement of each of said balls with reference to its seat, said crook being of sufficient depth to be capable of receiving said mirror plate when said other horizontal edge is uppermost whereby substantial movement of said mirror plate about a horizontal axis intersecting the center of said second ball is provided when either of said horizontal edges is uppermost.

References Cited in the file of this patent

UNITED STATES PATENTS

| Number | Name | Date |
|---|---|---|
| 1,455,441 | La Hodny | May 15, 1923 |
| 1,685,544 | La Hodny | Sept. 25, 1928 |
| 1,800,797 | Hoople | Apr. 14, 1931 |
| 1,806,059 | Hoople | May 19, 1931 |
| 1,823,636 | Winkler et al. | Sept. 15, 1931 |
| 1,868,031 | Sudbrink | July 19, 1932 |
| 1,909,526 | Falge | May 16, 1933 |
| 2,000,743 | Cohen | May 7, 1935 |
| 2,089,463 | Ritz-Woller | Aug. 10, 1937 |
| 2,112,656 | Ponce | Mar. 29, 1938 |
| 2,150,173 | La Hodny | Mar. 14, 1939 |
| 2,210,147 | Griffith | Aug. 6, 1940 |
| 2,629,286 | Budreck | Feb. 24, 1953 |
| 2,640,394 | Bertell et al. | June 2, 1953 |

FOREIGN PATENTS

| Number | Country | Date |
|---|---|---|
| 170,147 | Great Britain | Oct. 20, 1921 |
| 587,109 | France | Jan. 13, 1923 |
| 161,459 | Switzerland | July 1, 1933 |